United States Patent Office 2,950,258
Patented Aug. 23, 1960

2,950,258
DEHYDROGENATION CATALYST

Emory W. Pitzer and Lucien Bagnetto, Jr., Bartlesville, Okla., assignors to Phillips Petroleum Company, a corporation of Delaware No Drawing. Original application Aug. 29, 1956, Ser. No. 606,794, now Patent No. 2,888,499, dated May 26, 1959. Divided and this application July 17, 1958, Ser. No. 749,051

6 Claims. (Cl. 252—443)

This invention relates to the dehydrogenation of organic compounds. In one aspect it relates to a novel catalyst suitable for use in the dehydrogenation reaction. In another aspect it relates to an improved process for dehydrogenating mono-olefins, alkylpyridines and alkyl aromatics.

This application is a division of Serial No. 606,794, filed August 29, 1956, now U.S. Patent No. 2,888,499.

The dehydrogenation of mono-olefins, alkylpyridines and alkyl aromatics with conventional catalysts, suffers from the disadvantage that frequent regeneration is required to activate the catalyst. Treatment of the catalyst to restore activity may entail the use of oxygen or steam or mixtures thereof at elevated temperatures to remove carbonaceous materials. Regenerative treatment decreases the time during which the dehydrogenation reaction can be carried out, since the flow of hydrocarbon must be shut off during regeneration.

With some types of dehydrogenation catalysts it has been the practice to use small amounts of alkali oxides and alkaline earth oxides as promoters. Generally, these materials are used in amounts up to about 10.0 percent by weight. They tend to promote the dehydrogenation reaction and also aid in reducing the necessity for frequent regeneration. However, even with the use of promoting compounds, it has been necessary to periodically regenerate the catalysts, usually after only a few hours of operation. It is desirable, therefore, to provide a catalyst suitable for use in dehydrogenation which can be used for extended periods with little or no loss in catalytic properties.

It is an object of this invention to provide such a catalyst.

It is another object of this invention to provide an improved process and catalyst for the dehydrogenation of mono-olefins, alkylpyridines and alkyl aromatics.

Another object of this invetnion is to provide an improved process and novel catalyst for the dehydrogenation of mono-olefins having 4 to 10 carbon atoms.

Still another object of the invention is to provide an improved process and catalyst for the dehydrogenation of butene to butadiene.

These and other objects of the invention will become more readily apparent from the following detailed description and discussion.

The foregoing objects are achieved broadly by contacting mono-olefins, alkylpyridines and alkyl aromatics under suitable conversion conditions with a catalyst comprising oxides of iron, magnesium and chromium and/or copper and potassium carbonate, the potassium carbonate being present in a weight percent of at least about 30 percent based on the total catalyst. In a more specific aspect, the dehydrogenation process is carried out at a temperature of between about 1050° F. and about 1300° F. and with a steam to hydrocarbon ratio of between about 5 to 1 and about 30 to 1.

The catalysts of this invention comprise mixtures of the oxides of magnesium, iron and chromium and potassium carbonate. More usually, the metals other than potassium are present as magnesium oxide, ferric oxide and chromium oxide and/or cupric oxide. In the catalyst mixture, it is preferred that the potassium appear in the final form as the carbonate. Equivalent amounts of other potassium compounds can also be used in making the catalyst. These other compounds can be converted to the carbonate during the preparation of the catalyst or may convert to the carbonate during the use of the catalyst. Suitable compounds include potassium hydroxide, potassium carbonate, potassium nitrate, potassium acetate and similar materials.

In preparing the catalysts the Mg, Fe, Cr, and/or Cu are present in the following proportions calculated on the basis of their oxides.

| Component: | Percent by weight |
|---|---|
| MgO | 30–45 |
| $Fe_2O_3$ | 10–35 |
| $Cr_2O_3$ and/or CuO | 3–6 |

The potassium carbonate is present in a weight percent of at least about 30 or more, preferably in a weight percent of between about 30 and about 40 percent. The $Fe_2O_3$ is often in the range from 15–35 percent.

Although the catalysts of this invention can contain either oxides of chromium or copper, it has been found that the preferred catalysts are those which contain chromium. As will be hereinafter shown, the chromium containing catalyst is much more active than the copper catalyst, having otherwise the same composition.

The catalysts are prepared by a number of methods which include mixing or co-grinding of the metal oxides, by thermally decomposing salts of the metals, by coprecipitating hydrous oxides, etc. In one preferred method, the proper amounts of the oxide are milled together, for example in a hammer mill, following which a pelleting aid such as tannic acid is added to the mixture and subsequently the catalyst is pelleted in a suitable machine, such as a Stokes tablet machine. The catalyst pellets can also be formed by extrusion with satisfactory results. The final pellets are dried at temperatures of between about 200° F. and about 350° F. for a period of 1 to 24 hours, followed by a final heating at increasing temperatures to as high as 1050° F. to 1300° F., for an additional 1 to 24 hours. The catalyst can be prepared in any suitable form depending on the type of reaction system in which they are to be used, for example—they can be prepared in the form of pellets, Berl saddles, etc., or they can be finely divided to provide catalysts suitable for fluidization.

The organic compounds treated in this process are mono-olefins, alkyl pyridines and alkyl aromatics containing at least 2 carbon atoms in the alkyl group. Suitable mono-olefins are those having 4 to 10 carbon atoms such as, for example, butene-1, butene-2, methylethyl ethylene, trimethylethylene, isopropyl ethylene, pentene-1, hexene-1, etc. Specific dehydrogenation reactions include the dehydrogenation of 2-butene to butadiene and 2-methyl-2-butene to isoprene.

The dehydrogenation of ethyl benzene to styrene and the dehydrogenation of 2-methyl-5-ethylpyridine to 2-methyl-5-vinylpyridine are also important applications of the invention. The process is applicable generally to the feed materials stated although mono-olefins of 8 or less carbon atoms and alkylbenzenes or alkylpyridines with 1 to 4 alkyl groups each having 6 or less carbon atoms with at least one alkyl group of two or more carbon atoms are most applicable from the standpoint of yield, selectivity and economics.

The dehydrogenative reaction is carried out at an elevated temperature between about 1050° F. and about 1300° F. and with a steam to olefin ratio of between about 5 to 1 and about 30 to 1 by volume. The pressure preferably is maintained at a low level, usually at atmospheric or slightly above atmospheric. The process is preferably conducted in a fixed bed; however, fluidized or suspended catalyst techniques can be used. In this type of operation it is usually preferred to maintain a gas space velocity of between about 50 and about 2500 volumes per hour of olefin per volume of catalyst. Advantageously, 0.5 to 2 mol percent of carbon dioxide, based on the total feed, can be introduced to the reaction zone to minimize migration of the potassium compound through the catalyst bed and and possible loss thereof from the reaction zone. In some cases, the catalyst can be improved by calcining the iron oxide before making the catalyst.

The catalyst of the present invention is particularly advantageous in that it allows substantially continuous operation without the necessity of frequent periodic regeneration of catalyst. The operation under substantially auto-regenerative conditions is facilitated by the high percentage of potassium carbonate in the catalyst. The potassium carbonate promotes the water-gas reaction so that the carbon, as it forms, reacts with steam present in the gases to produce oxides of carbon which are carried out with the reaction mixture. Thus, only a small equilibrium amount of carbon is present on the catalyst and this is insufficient to interfere substantially with the dehydrogenation reaction.

The following specific catalyst and tests are presented in illustration of the catalyst and process of this invention:

CATALYST PREPARATION

Catalyst I

This catalyst was prepared by mixing proper amounts of magnesium oxide, ferric oxide, chromium sesquioxide and potassium carbonate and grinding the mixture in a Raymond hammer mill to pass a 50 mesh screen. Following this, 2.4 percent tannic acid (in an amount equivalent to 5 percent of the catalyst by weight) was mixed with the catalyst, the mixture was sieved through a 28 mesh sieve, after which graphite was added in an amount equal to ½ of 1 percent of the catalyst by weight. This mixture was then formed to ¼ inch tablets, ground to 12 mesh and finally formed to ⅛ inch tablets. The final treatment comprised heating the tablets at 350° F. for 16 hours and then at increasing temperatures to 1100° F. for an additional 18 hours. The catalyst composition was magnesium oxide 42.2 weight percent, potassium carbonate 35.2 weight percent, ferric oxide 18.4 weight percent and chromium sesquioxide 4.2 percent.

Catalyst II

This catalyst was prepared in the same manner as Catalyst I and had a final composition of magnesium oxide 42.2, potassium carbonate 35.2 percent, ferric oxide 18.4 and cupric oxide 4.2 percent.

Catalyst III

This catalyst was prepared in the same manner as catalyst I and had a final composition of magnesium oxide 57.4 percent, potassium carbonate 20.0 percent, ferric oxide 18.4 and cupric oxide 4.2 percent.

Catalyst IV

This catalyst was prepared in the same manner as Catalyst I and had a final composition of magnesium oxide 70.7 percent; potassium carbonate 7.1 percent; ferric oxide 18.1 percent and cupric oxide 4.1 percent.

EXAMPLES

A series of tests were made utilizing the prepared catalysts. In carrying out the tests, a feed material comprising butene-2 and steam in a volume ratio of about 12 to 1 was passed through a stationary bed of catalyst at the following reaction conditions for the production of butadiene.

Temperature _____ 1130 to 1190° F.
Pressure _____ Atmospheric.
Butylene _____ SV 400 cubic feet per hour/cubic foot.

The tests were carried out over time periods of 24, 48 and 96 hours with steaming between periods as follows:

| Cycle | Period | |
|---|---|---|
| | Dehydrogenation | Steam |
| 24 Hours [1] | 23 | 1 |
| 48 Hours | 46 | 2 |
| 96 Hours | 94 | 2 |

[1] For example, operation on a 24 hour cycle would include: Dehydrogenation of butene-2 for 23 hours, followed by steaming in the absence of butene-2 for 1 hour, followed by dehydrogenation of butene-2 for 23 hours, followed by steaming in the absence of butene-2 for 1 hour, etc. In each case, the steaming was carried out at the same temperature as the dehydrogenation reaction and the quantity of steam was the same as that used during dehydrogenation.

In Table I there is presented a series of consecutive cycles with catalyst I:

TABLE I

| Age, Days | Average Temperature, °F. | Hours Since Steaming [a] | Mol Percent | | |
|---|---|---|---|---|---|
| | | | Conversion [b] | Yield [c] | Selectivity [d] |
| 10.38 | 1,129 | 22 | 25.4 | 21.1 | 83.1 |
| 11.50 | 1,129 | 4 | 24.0 | 20.0 | 84.2 |
| 13.29 | 1,145 | 47 | 28.2 | 22.6 | 80.1 |
| 14.42 | 1,154 | 4 | 29.9 | 24.1 | 80.6 |
| 16.29 | 1,176 | 44 | 38.5 | 29.7 | 77.1 |
| 17.37 | 1,167 | 4 | 35.2 | 28.2 | 80.1 |
| 19.17 | 1,193 | 47 | 38.9 | 29.5 | 75.8 |
| 20.34 | 1,189 | 4 | 38.0 | 29.8 | 78.4 |
| 25.58 | 1,133 | 41 | 17.7 | 13.8 | 78.0 |
| 26.77 | 1,133 | 4 | 21.0 | 16.3 | 77.6 |
| 31.75 | 1,149 | 94 | 22.2 | 19.5 | 87.8 |
| 32.88 | 1,151 | 4 | 23.0 | 20.1 | 87.4 |
| 49.38 | 1,150 | 24 | 21.8 | 18.8 | 86.2 |
| 50.54 | 1,154 | 4 | 23.5 | 20.3 | 86.4 |
| 58.92 | 1,150 | 23 | 22.0 | 19.0 | 84.4 |
| 60.04 | 1,147 | 4 | 22.2 | 18.2 | 82.0 |
| 79.13 | 1,150 | 48 | 19.8 | 17.1 | 86.4 |
| 80.25 | 1,153 | 4 | 21.2 | 18.5 | 87.3 |
| 99.25 | 1,149 | 23 | 18.5 | 16.3 | 88.1 |
| 100.38 | 1,153 | 4 | 22.3 | 19.3 | 86.5 |

[a] Number of hours of dehydrogenation since the catalyst was last steamed in the absence of butene-2 feed.
[b] Mols butene-2 destroyed/100 mols charged.
[c] Mols butadiene produced/100 mols butene-2 charged.
[d] (Yield/Conversion) ×100.

It is to be noted that the runs of Table I cover a catalyst life of approximately 100 days or 2400 hours. During this time the catalyst was operating during a number of operating cycles of various time durations, namely from 22 hours to as high as 96 hours. Referring to the data in the table, it is apparent that this catalyst retained a high degree of activity and selectivity over extended periods of time. For example, at a catalyst age of 31.75 days, it is to be noted that after 94 hours of operation the percent conversion, yield and selectivity were 22.2, 19.5 and 87.8 respectively. This compares very favorably with the catalyst aging 32.88 days, where after only four hours of operation on the current cycle the conversion, yield, and selectivity were 23.0, 20.1 and 87.4 respectively. Additional tests throughout the series of cycles indicate the same small degree of change in these properties.

If the over-all life of the catalyst is considered, it is to be noted that 32.88 days after 4 hours of operation, the conversion, yield, and selectivity were 23.0, 20.1 and 87.4, as compared to the catalyst of 100.38 days which after four hours of operation showed a conversion, yield and selectivity of 22.3, 19.3 and 86.5. During this period of operation of over 1,600 hours, there was practically no change in the conversion, yield, and selectivity of the catalyst.

In Table II are presented average figures for the conversion, yield and selectivity of the cycles of Table I from 31.75 days to 100.38 days.

TABLE II

| Average Temperature, ° F. | Average Hours Since Steaming [1] | Average Mol Percent | | |
|---|---|---|---|---|
| | | Conversion | Yield | Selectivity |
| 1,150 | 42 | 20.9 | 18.1 | 86.6 |
| 1,150 | 4 | 22.4 | 19.3 | 85.9 |

[1] See note (a) of Table I.

It is to be noted that during the series of cycles of approximately 42 hours average average duration, the average conversion and average yield decreased less than 8 percent and the selectivity increased about 0.9 percent.

In Table III are present a series of consecutive cycles with catalyst IV:

TABLE III

| Age, Days | Average Temperature | Hours Since Steaming [1] | Mol Percent | | |
|---|---|---|---|---|---|
| | | | Conversion | Yield | Selectivity |
| 1.00 | 1,129 | 24.0 | 10.3 | 7.9 | 76.7 |
| 4.79 | 1,129 | 43.0 | 17.1 | 15.1 | 88.3 |
| 5.00 | 1,133 | 4.0 | 30.9 | 27.8 | 90.0 |
| 10.58 | 1,129 | 24.0 | 14.3 | 13.0 | 90.9 |
| 11.67 | 1,133 | 4.0 | 28.1 | 25.3 | 90.0 |
| 15.42 | 1,129 | 49.0 | 10.6 | 9.7 | 91.5 |
| 16.54 | 1,133 | 4 | 24.2 | 22.2 | 91.7 |
| 20.13 | 1,133 | 23 | 13.4 | 11.9 | 88.8 |
| 21.30 | 1,125 | 4 | 20.9 | 19.0 | 90.9 |
| 29.83 | 1,132 | 27 | 11.1 | 10.4 | 93.7 |
| 30.83 | 1,133 | 4.0 | 24.1 | 22.1 | 91.7 |
| 34.73 | 1,129 | 53 | 9.8 | 9.0 | 92.0 |
| 35.67 | 1,129 | 4.0 | 13.1 | 11.9 | 90.8 |

[1] See note (a) of Table I.

It is to be noted that this catalyst quickly loses its activity under ordinary dehydrogenating conditions. For example, in the conversion column, starting at catalyst age 11.67 days, the percent conversion drops off from 28.1 at 4 hours after steaming to 10.6 at 44 hours after steaming. Again, at 16.54 days, the percent conversion drops from 24.2 at 4 hours after steaming to 13.4 at 23 hours after steaming. It is obvious that this catalyst must be steamed at substantially less than 24 hours intervals if the conversion is to be maintained at a reasonable level.

The results of additional runs and representative data from Tables I and II are presented in Tables IV, V and VI:

TABLE IV

| Temperature Profile | Mol Percent Yield of Butadiene (Samples after 24–48 Hours of Dehydrogenation) | | | |
|---|---|---|---|---|
| Operating Temperature, ° F | 1,130 | 1,150 | 1,170 | 1,190 |
| Catalyst IV | 9.4 | | | |
| Catalyst II | 14.6 | 17.0 | 18.3 | 19.8 |
| Catalyst I | 21.1 | 22.6 | 29.7 | 29.5 |
| Catalyst III | 12.3 | 17.8 | 17.8 | |

TABLE V

[Effect of dehydrogenation period length.]

| Hours after Steaming [1] | Catalyst IV | | Catalyst II | | Catalyst I | | Catalyst III | |
|---|---|---|---|---|---|---|---|---|
| | 4 | 44 | 4 | 44 | 4 | 44 | 4 | 44 |
| Mol Percent Yield of Butadiene | 25.3 / 22.1 | 9.7 / 9.0 | 21.9 / 21.9 / 18.2 | 21.5 / 19.8 / 18.3 | 28.2 / 29.8 / 20.1 | 29.7 / 29.5 / 19.5 | 15.1 / 18.6 / 18.8 | 12.3 / 17.8 / 17.8 |
| Average | 23.7 | 9.4 | 20.7 | 19.9 | 26.0 | 26.2 | 17.5 | 16.0 |

[1] See note (a) of Table I.

TABLE VI

| Hours after steaming [1] | Composition, Weight Percent | | | | Yield of Butadiene, Mol Percent | | | | | |
|---|---|---|---|---|---|---|---|---|---|---|
| | | | | | 1,130 F. | | 1,150 F. | | 1,170 F. | |
| | $K_2CO_3$ | MgO | CuO | $Fe_2O_3$ | 4 | 48 | 4 | 48 | 4 | 48 |
| Catalyst III | 20.0 | 57.4 | 4.2 | 18.4 | 15.1 | 12.3 | 18.6 | 17.8 | 18.8 | 17.8 |
| Catalyst II | 35.2 | 42.2 | 4.2 | 18.4 | 15.4 | 14.6 | 18.1 | 17.0 | 21.9 | 21.5 |

[1] See note (a) of Table I.

Referring to Table IV, it is noted that catalysts I, II and III retain their activity through extended periods of operation, whereas catalyst IV is reduced to less than 40 percent of its original activity. This indicates the superiority of the high potassium catalyst. This table also shows the superiority of the chromium sesquioxide catalyst (I) over the cupric oxide catalyst (II) with the other components including potassium carbonate present in the same amounts in both catalysts.

Having thus described the invention by providing specific examples thereof, it is to be understood that no undue limitations or restrictions are to be implied by reason thereof and that many variations and modifications are clearly within the scope of the invention.

We claim:

1. A catalyst which comprises between 30 percent and 45 percent magnesium oxide, between 10 percent and 35 percent ferric oxide, between 3 percent and 6 percent of a component selected from the group consisting of cupric oxide and chromium sesquioxide, and at least 30 percent potassium carbonate.

2. A catalyst of claim 1 in which the potassium carbonate is present in an amount between 30 percent and 40 percent.

3. A catalyst suitable for dehydrogenating a compound selected from the group consisting of mono-olefins, alkylpyridines and alkyl aromatics which comprises between 30 percent and 45 percent magnesium oxide, between 10 percent and 35 percent ferric oxide, between 3 percent and 6 percent chromium sesquioxide, and at least 30 percent potassium carbonate.

4. A catalyst of claim 3 in which the potassium carbonate is present in an amount between 30 percent and 40 percent.

5. A catalyst suitable for dehydrogenating a compound selected from the group consisting of mono-olefins, alkylpyridines and alkyl aromatics which comprises between 30 percent and 45 percent magnesium oxide, between 10 percent and 35 percent ferric oxide, between 3 percent and 6 percent cupric oxide, and between 30 percent and 40 percent potassium carbonate.

6. A catalyst which comprises between 30 percent and 45 percent magnesium oxide, between 15 percent and 35 percent ferric oxide, between 3 percent and 6 percent of a component selected from the group consisting of cupric oxide and chromium sesquioxide and at least 30 percent potassium carbonate.

References Cited in the file of this patent
UNITED STATES PATENTS

| | | |
|---|---|---|
| 2,147,780 | Van Kahler | Feb. 21, 1939 |
| 2,414,585 | Eggertsen | Jan. 21, 1947 |
| 2,509,869 | Kirshenbaum | May 30, 1950 |
| 2,866,790 | Pitzer | Dec. 30, 1958 |